(12) United States Patent
Wilhelm et al.

(10) Patent No.: US 10,442,038 B2
(45) Date of Patent: Oct. 15, 2019

(54) METHODS FOR THE PRODUCTION OF WORKPIECES

(71) Applicant: TRUMPF Werkzeugmaschinen GmbH + Co. KG, Ditzingen (DE)

(72) Inventors: Markus Wilhelm, Gerlingen (DE); Marc Klinkhammer, Ditzingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 15/706,947

(22) Filed: Sep. 18, 2017

(65) Prior Publication Data
US 2018/0085864 A1 Mar. 29, 2018

(30) Foreign Application Priority Data

Sep. 26, 2016 (EP) ..................... 16190651

(51) Int. Cl.
| | | |
|---|---|---|
| *B23K 1/00* | (2006.01) | |
| *B23K 37/00* | (2006.01) | |
| *B23K 37/04* | (2006.01) | |
| *B23K 37/047* | (2006.01) | |
| *B23Q 1/66* | (2006.01) | |
| *B23Q 7/04* | (2006.01) | |
| *B32B 15/01* | (2006.01) | |
| *B21D 28/02* | (2006.01) | |
| *B21D 28/10* | (2006.01) | |
| *B21D 28/26* | (2006.01) | |
| *B21D 39/03* | (2006.01) | |

(Continued)

(52) U.S. Cl.
CPC .......... *B23K 37/0408* (2013.01); *B21D 28/02* (2013.01); *B21D 28/10* (2013.01); *B21D 28/265* (2013.01); *B21D 39/03* (2013.01); *B21D 43/02* (2013.01); *B23K 37/047* (2013.01); *B23P 11/00* (2013.01); *B23Q 1/66* (2013.01); *B23Q 7/047* (2013.01); *B32B 15/01* (2013.01); *B21D 35/007* (2013.01); *B23K 2101/18* (2018.08); *B23Q 3/15566* (2013.01); *F16B 17/00* (2013.01); *Y10T 483/1731* (2015.01)

(58) Field of Classification Search
None
See application file for complete search history.

(56) References Cited

FOREIGN PATENT DOCUMENTS

| DE | 195 24 235 | 1/1997 |
|---|---|---|
| DE | 102013221279 | 4/2015 |

(Continued)

*Primary Examiner* — Erin B Saad
(74) *Attorney, Agent, or Firm* — Fish & Richardson P.C.

(57) ABSTRACT

A method for the production of workpieces includes positioning and holding a first plate-shaped material with a gripping device in a working region of a processing station so that the first plate-shaped material is moveable relative to a workpiece support, positioning and holding a second plate-shaped material with an additional gripping device in the working region of the processing station so that the second plate-shaped material is moveable relative to the workpiece support, producing a first workpiece part from the first plate-shaped material, positioning the first workpiece part with respect to the second plate-shaped material, connecting the first workpiece part to the second plate-shaped material or to a second workpiece part produced from the second plate-shaped material, wherein the second workpiece part is at least partially processed, and finishing the at least the second workpiece part that is connected to the first workpiece part in the processing station.

15 Claims, 4 Drawing Sheets

(51) Int. Cl.
  *B21D 43/02* (2006.01)
  *B23P 11/00* (2006.01)
  *B23Q 3/155* (2006.01)
  *B23K 101/18* (2006.01)
  *B21D 35/00* (2006.01)
  *F16B 17/00* (2006.01)

(56) References Cited

FOREIGN PATENT DOCUMENTS

JP    2001 334329    12/2001
KR    20040017462    2/2004

METHODS FOR THE PRODUCTION OF WORKPIECES

CROSS-REFERENCE TO RELATED APPLICATION

This application claims priority from European Application No. 16190651, filed on Sep. 26, 2016. The entire contents of this priority application are hereby incorporated by reference.

TECHNICAL FIELD

The invention relates to a method for the production of workpieces made of several plate-shaped materials.

BACKGROUND

A method for the production of a molded part with different material thicknesses is known from DE 195 24 235 A1. In this case, a base board is firstly cut to an intermediate or finished size. A reinforcing element is then cut and attached to the base board by a joining technique such as, for example, adhesive bonding, welding or soldering, as well as clinching. Further punching and forming steps are subsequently carried out on the base board to produce the molded part.

SUMMARY

This disclosure provides methods for producing reinforced workpieces by processing plate-shaped materials that are the same or differ from one another in an automated and reliable manner.

In these new methods, a first plate-shaped material is positioned in a working region of a processing station in a workpiece processing machine and is moveably held by a gripping device along a workpiece support in the working region of the processing station. At least one second plate-shaped material is positioned in the working region of the processing station and is moveably held by an additional gripping device of the processing station along the workpiece support in the working region. At least one first workpiece part is produced from the first plate-shaped material and the at least one first workpiece part is moved to the second plate-shaped material in the working region, and is connected to this second plate-shaped material or to a second workpiece part that is produced from the second plate-shaped material and that is at least partially processed. The second workpiece part, which is now connected to the at least one first workpiece part, is finished in the processing station. This method makes it possible, for example, for the first and second plate-shaped materials to differ from each other in terms of material thickness and/or material selection, while both are simultaneously positioned in the same working space of the processing station and held with the gripping devices. As a result, for example, at least one first workpiece part is produced from one of the two plate-shaped materials and is positioned on the other plate-shaped material, from which the second workpiece part is produced, and is connected to subsequently produce a reinforced workpiece. Intermediate storage is not required while moving the workpiece parts from the at least one plate-shaped material to the adjacent plate-shaped material. In fact, rapid successive processing may be enabled. A reduction in the cycle time can be achieved as a result.

In the methods described herein, several plate-shaped materials can also be arranged in the working region such that not only workpieces consisting of two different tiers and/or layers can be produced, but also multi-layer workpieces or sandwich constructions. It is also conceivable to produce a workpiece from at least two workpiece parts with recesses or grooves for the formation of channels or cavities. The construction of conductor tracks on an insulating base material is also possible with the new methods. When using plate-shaped materials with different properties, for example, at least one tier and/or layer of wear-resistant material can be arranged on a soft base material.

In some embodiments, the first and/or second workpiece part is cut free from the plate-shaped material or a resulting residual grid with a final processing step in the processing region of the processing stations. At least one of the two workpiece parts can thus remain on the second plate-shaped material or a residual grid formed therefrom up to a final processing step or working step, and can be moved within the workpiece support until all required working steps have been carried out. Only after this is the reinforced workpiece cut free and transported away from the workpiece support.

In some embodiments, the second workpiece part is partially finished before the at least one first workpiece part is placed thereon, or is finished except for at least one connecting bridge to the residual grid of the second plate-shaped material or to the plate-shaped material. As a result, process optimization is possible. In particular, punched-out portions, embossments, depressions or deformations can be introduced into the second workpiece part that could not be introduced after the positioning of the at least one first workpiece part relative to the second workpiece part.

In further embodiments, the at least one first workpiece part is lifted out of the plane of the workpiece support by a tool and is positioned in an overlapping manner on the second plate-shaped material, in particular the at least second partially processed workpiece part in the second plate-shaped material. As a result, the traversing or lifting axes can be used in the processing station for the traversing movement of the at least one first workpiece part relative to the second plate-shaped material, enabling simple control of the tool in the processing station.

The handling of the at least one workpiece part for positioning relative to the second plate-shaped material can be carried out with a punching handling tool. Such a punching handling tool makes it possible for the first workpiece part to be cut free from the residual grid of the first plate-shaped material at the same time as clamping or wedging using the separating tool (e.g., using the punch). Thus, no tool change is required, but rather the punching handling tool can both cut free and position the first workpiece part on the second workpiece part. Alternatively, after cutting the first workpiece part free from the residual grid of the first plate-shaped material, the second workpiece part can be moved by a handling device such as, for example, a suction gripping device. To further reduce the process times, several first workpiece parts can be simultaneously gripped and positioned on the second plate-shaped material by the suction gripping device.

Furthermore, a holding bracket or a holding frame is formed on the at least one first workpiece part for handling, the holding bracket or holding frame being detached after the first workpiece part has been connected to the second plate-shaped material. These additional holding brackets or the holding frames are selected, for example, for components that are small or difficult to handle and whose surface is not suitable for a suction gripping element of the suction gripping device.

In some embodiments, before the first workpiece part is positioned relative to the second, at least partially processed workpiece part or second plate-shaped material, at least one positioning aid is introduced into the at least one first and/or the second workpiece part. As a result, self-alignment and centering can be enabled when the first workpiece part is positioned relative to the second workpiece part. Such a positioning aid can be implemented, for example, by a hole and a centering stud or centering nipple. An embossment and a complementary depression can also be formed.

The at least one first workpiece part or the second at least partially processed workpiece part can be connected to one another by joining, e.g., by clinching without additional material, or by adhesive bonding, soldering, welding, or mechanical locking. The type of connection selected depends on the selected materials and/or thicknesses or thickness ratios of the at least one first workpiece part and the second workpiece part.

A further advantageous embodiment of the methods provides that several first workpiece parts are at least partially finished in the first plate-shaped material, and that a number of second workpiece parts corresponding to the number of first workpiece parts in the first plate-shaped material are at least partially processed in the second plate-shaped material. The first and second workpiece parts are held by connecting bridges in the respective residual grid or in the plate-shaped material and the first and second plate-shaped material having the first and second workpiece parts are simultaneously positioned with respect to one another. In particular, during the production of a large number of identical, reinforced workpieces, a further reduction in the process times can be achieved, because the first workpiece part is not positioned individually relative to the second workpiece part, but rather a plurality of first workpiece parts are simultaneously positioned relative to the second workpiece parts by all of the plate-shaped material.

According to one embodiment of the methods described above, the first plate-shaped material can be raised and positioned in an overlapping manner with the second plate-shaped material. Alternatively, the first plate-shaped material can be positioned by folding over to the second plate-shaped material. Depending on which of the two positioning steps is selected, the geometry of the workpieces must be aligned accordingly in the plate-shaped material.

Furthermore, the first and at least one second plate-shaped material are preferably processed with at least one punching tool and/or bending tool and/or by laser cutting in the processing station. The workpiece processing machines are preferably designed as so-called punching and combination machines that enable both punching and laser cutting. If applicable, individual bending processes can also be carried out.

In some embodiments, the reinforced workpiece has two parts and is produced from a plate-shaped material and a connecting component. For example, the connecting component can be a threaded insert or a threaded sleeve or another connecting element to enable a secure connection between a sheet metal part and a further component.

A preferred embodiment is also conceivable in which the reinforced workpiece is produced by the methods from at least two plate-shaped materials with the same and/or different thicknesses, materials, and dimensions, and recesses such as bores, elongated holes, as well as threads or passages are introduced into the region of the workpiece reinforced therewith.

Furthermore, the methods can be used to produce a reinforced workpiece as an assembly of several, (e.g., different), materials. For example, a facade component can be produced which, on the one hand, comprises a high-quality surface and which, on the other hand, is connected to an inferior support component.

Furthermore, the methods can be used to form a workpiece with a multi-layer construction. For example, structured sandwich panels can be produced that have stiffening ribs and/or stiffening contours, wherein the use of the materials can be adapted to the requirements such as, for example, the visual appearance, the strength, the weather resistance, or similar.

The invention and further advantageous embodiments and developments thereof are described and explained in more detail below by the examples depicted in the drawings. The features indicated in the description and the drawings can be applied individually or together in any combination according to the invention.

DETAILED DESCRIPTION

Figure 1:
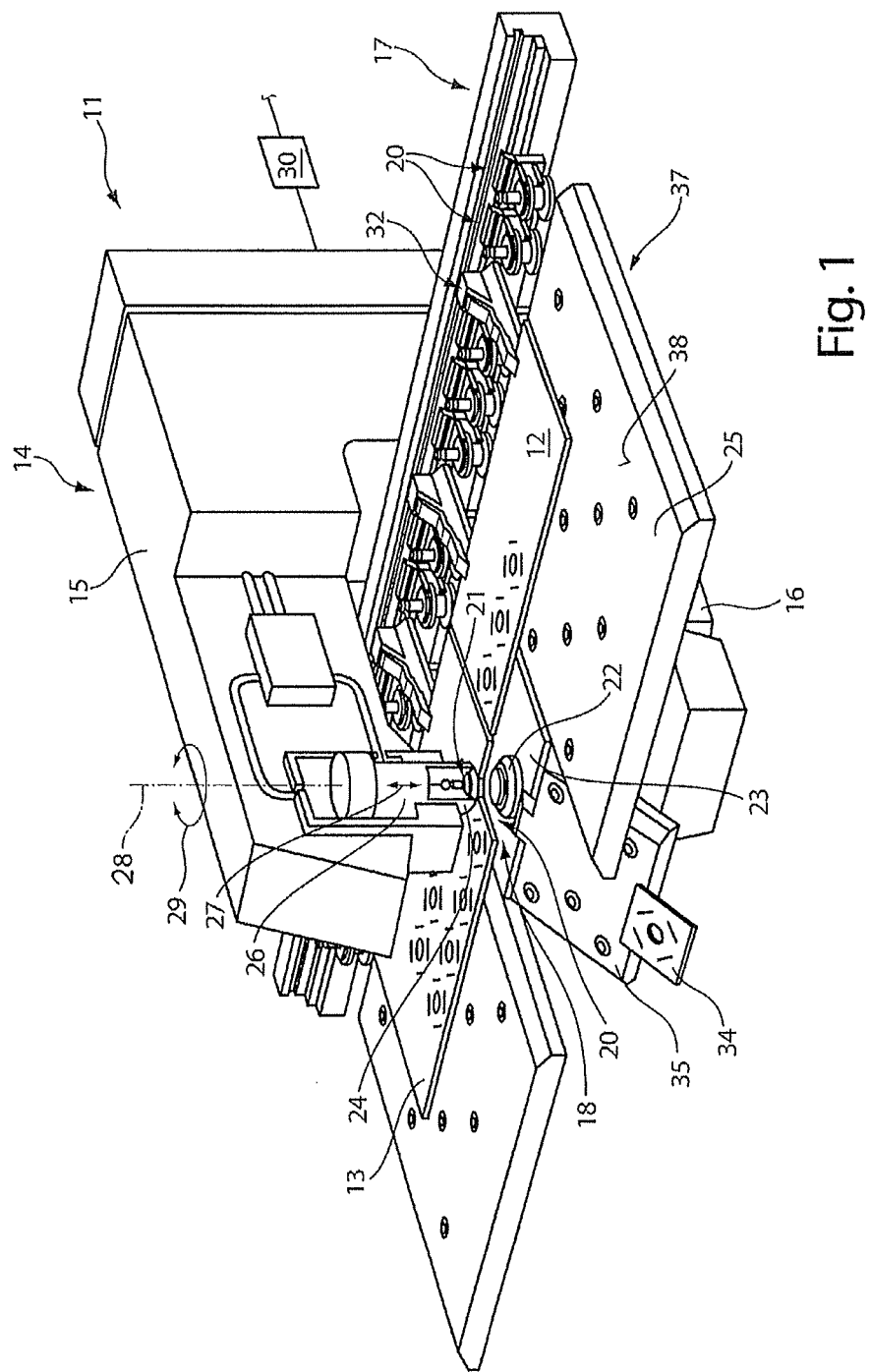
FIG. 1 is a perspective view of a workpiece processing machine.

FIG. 1 is a perspective view of a workpiece processing machine 11 for processing plate-shaped materials 12, 13 such as, for example, metal sheets. The processing of such plate-shaped materials 12, 13 can include punching, bending, signing embossing, engraving, deburring, roll forming, and in particular examples, roll pinching, thread forming, and film separation of a film on the surface of the plate-shaped material. Furthermore, such a workpiece processing machine 11 can additionally enable cutting processing, e.g., by a laser. The workpiece processing machine 11 has a C-shaped base frame 14 having an upper frame leg 15 and a lower frame leg 16. A conventional coordinate guide 17 is accommodated in a throat region between the upper frame leg 15 and the lower frame leg 16. This guide positions or moves the plate-shaped workpieces 12, 13 with respect to a processing station 18 of the workpiece processing machine 11 and stores, changes, and replaces tools 20 in the processing station 18.

A tool 20 can be changed in the processing station 18, and each tool 20 includes an upper tool 21 and a lower tool 22. The lower tool 22 is arranged on the machine table 25 in a lower tool receiver 23, the machine table 25 resting on the lower base frame 16 of the machine frame 14 on one side. The upper tool 21 is mounted on an upper tool receiver 24 of a pusher 26. The upper tool 21 can be moved up and down hydraulically, for example, on the upper frame leg 15 of the frame 14 in the direction of double arrow 27. Both the upper tool 21 and the lower tool 22 can be adjusted or fed around a lifting axis 28 of the pusher 26 in the direction of double arrow 29. Corresponding feed motions are also controlled by a schematically depicted control device 30 of the workpiece processing machine 11, as are other essential machine functions. A working region 37 of the processing station 18 is formed by at least one workpiece support 38 of the machine table 25. At least one first plate-shaped material 12 is held by a gripping device 32 during processing by the tool 20 and is guided in the processing station 18 in a moveable manner in the working region 37. At least one further or second plate-shaped material 13 is held in the working region 37 by a further gripping device 39 (shown in e.g., FIG. 2). Gripping device 39 can advantageously correspond to the gripping device 32. These two gripping devices 32, 39 can be controlled independently of each other to move the first plate-shaped material 12 and second plate-shaped material 13 on the workpiece support 38. Alternatively, further plate-shaped materials can be arranged and received in the working region 37 by further gripping devices.

The first plate-shaped material 12 can differ from the second plate-shaped material 13, in terms of the material thickness, material selection and/or the surface of the plate-shaped material. After finishing a reinforced workpiece 34 from the first and at least one additional, e.g., the second plate-shaped material as described in more detail below, a reinforced workpiece 34 is guided out of the processing station 18, for example, by lowering a table segment 35 of the machine table 25.

FIGS. 2 to 8 show consecutive working steps for producing the reinforced workpiece 34 with the workpiece processing machine 11 of FIG. 1. In this exemplary embodiment, the reinforced workpiece 34 described below is, for example, a thickened or reinforced sheet metal part with a reinforcing layer in one region for stiffening and/or higher force absorption.

Figure 2:
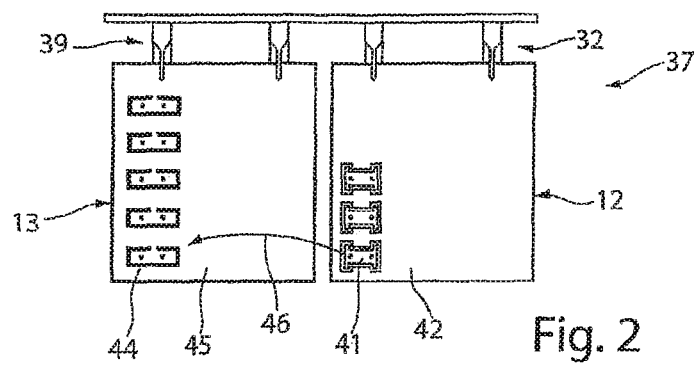
FIG. 2 is a top view of a working region with two plate-shaped materials of a processing station of the workpiece processing machine of FIG. 1.
Figure 3:
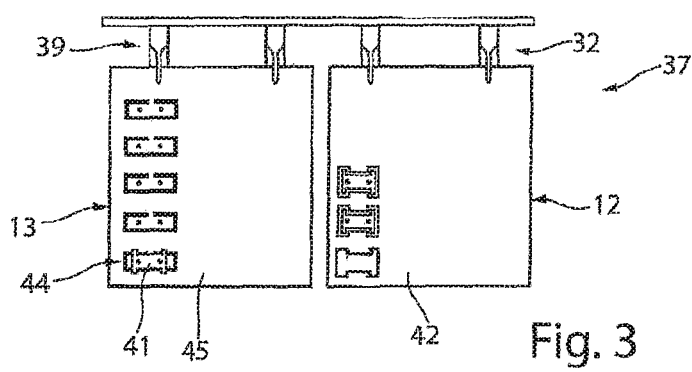
FIG. 3 is a top view of two plate-shaped materials in a further processing step.

FIG. 2 shows a schematic view from above of the working region 37 of the processing station 18, wherein a first plate-shaped material 12 is picked up by a gripping device 32 and the second plate-shaped material 13 is picked up by the further gripping device 39. This second plate-shaped material 13 can be the same as the first plate-shaped material 12, but advantageously can be different. In a first working step, the first and second plate-shaped materials 12, 13 are processed together or individually. First workpiece parts 41 are produced in the first plate-shaped material 12 and are either completely separated from the residual grid 42 or are fixedly held to the residual grid 42 with at least one connecting bridge. In the second plate-shaped material 13, processing for a second processed workpiece part 44 also takes place. This processing can be carried out only partially, or completely such that the second workpiece part 44 remains connected to the resulting residual grid 45 only via at least one connecting bridge.

FIG. 2 shows that several identical first workpiece parts 41 and several identical second workpiece parts 44 are formed. This is carried out, for example, in a small-part series production. However, individualized first and second workpiece parts 41, 44 can also be produced in each case.

The processed workpiece part 41 is then detached from the residual grid 42 if a connecting bridge still exists. Subsequently, the workpiece part 41 is lifted from the workpiece support 38 and positioned relative to the second workpiece part 44 according to arrow 46 in FIG. 2 to the configuration shown in FIG. 3. For example, a suction gripping device which is not shown in more detail (e.g., a suction gripper or a vacuum gripper), positions the first workpiece part 41. Alternatively, a punching handling tool can both separate the connecting bridge between the first workpiece part 41 and the residual grid 42 and at the same time introduce a punching contour into the first workpiece part 41 and hold it in a clamped or tensioned manner to carry out the traversing movement towards the second workpiece part 44. The first workpiece part 41 can also be held in a clamped manner in a depression on an upper part or lower part of the punching handling tool for the traversing movement of arrow 46. It is also possible to position the second workpiece part 44 under the first workpiece part 41 that has been lifted out.

Figure 4:
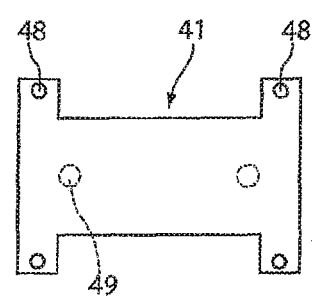
FIG. 4 is a schematic enlarged view from above of a first workpiece part.

FIG. 4 shows, by way of example, an enlarged top view of the first workpiece part 41. This first workpiece part 41 has positioning aids 48. These aids can, for example, be catching holes that are introduced in a punching step. Furthermore, embossments 49 in the form of elevations or depressions can be introduced into the first workpiece part 41, by means of which a positive connection to the further workpiece part 44 can be achieved analogously to the positioning aids 48.

Figure 5:
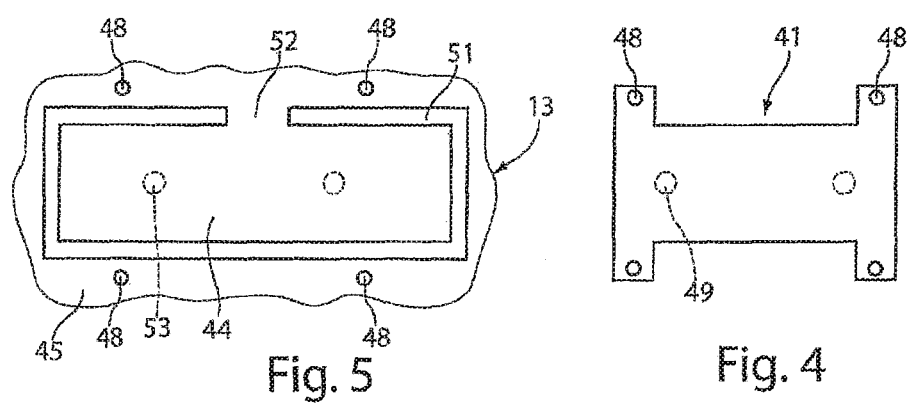
FIG. 5 is a schematic enlarged view from above of a second partially processed workpiece part.

FIG. 5 shows a schematic view of the second workpiece part 44 that is separated from the plate-shaped material 13 by a separating cut 51, except for a connecting bridge 52. Positioning aids 48 are introduced adjacent to the second workpiece part 44, and the positioning aids 48 can be adjusted to align with the positioning aids 48 of the first workpiece part 41. In this case, the positioning aids 48 on the second plate-shaped material 13 are formed as catching studs or elevations to engage in the catching holes in the first workpiece part 41. Additionally or alternatively, punched-out portions 53 may be provided, with which the embossment 49 of the first workpiece part 41 can also engage to form a positive connection.

Figure 6:
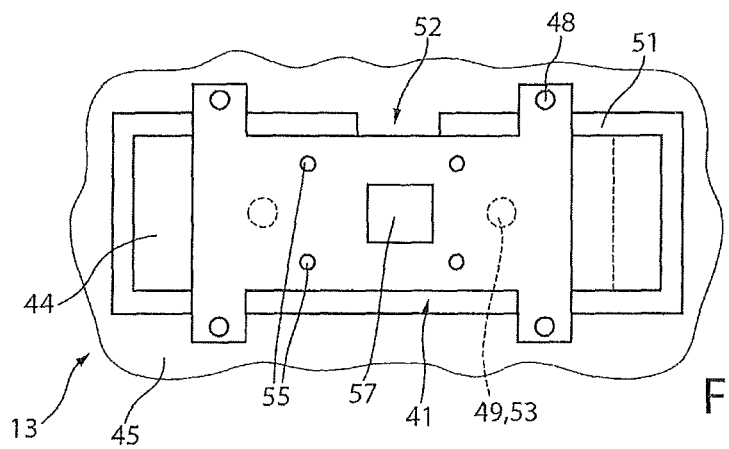
FIG. 6 is a schematic view from above of a processing step for the production of a reinforced component made from the first and second workpiece parts shown in FIG. 4 and FIG. 5.
Figure 7:
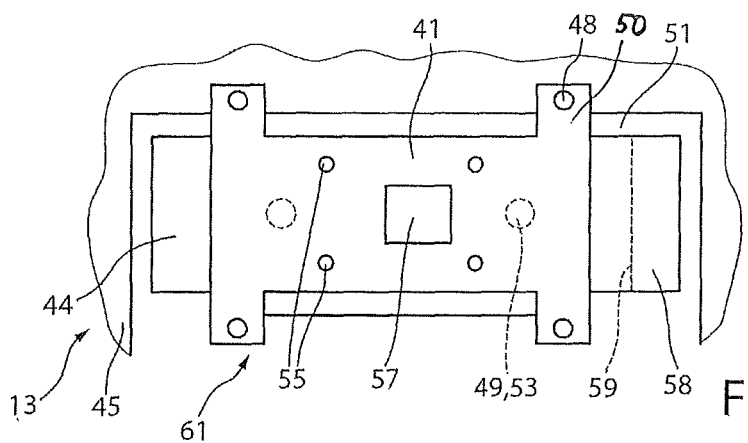
FIG. 7 is a schematic view from above of a subsequent processing step for the production of the reinforced workpiece of FIG. 6.
Figure 8:
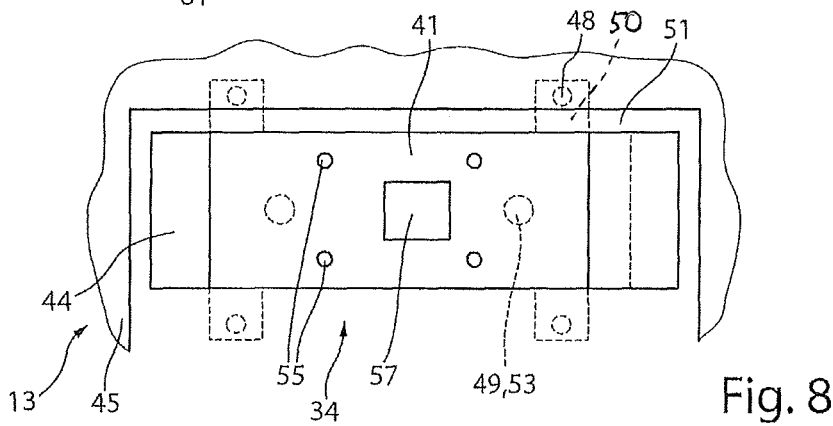
FIG. 8 is a schematic view from above of a final processing step for the production of the reinforced workpiece.

In FIG. 6, the first workpiece part 41 is positioned in an overlapping manner with the second workpiece part 44. A positive connection can be achieved by the positioning aids 48 and/or the embossment 49 and the punched-out portion 53 to position the two parts in alignment with each other. For example, a positive connection is formed by the positioning aids 48 outside the reinforced component 34; the positive connection is formed between the residual grid 45 and the first workpiece part 41.

With respect to the embossments 49 and punched-out portions 53, the positive connection can alternatively be formed between the first and second workpiece parts 41, 44.

One or more connection points 55 can be provided for connecting the first workpiece part 41 and the second workpiece part 44. A frictional material and/or positive connection may be produced. Welding points or knockouts or similar may be provided. The first workpiece part 41 is fixedly connected to the second workpiece part 44 as a result. Such a parts composite can then be processed repeatedly. Such a subsequent processing is described in more detail below with respect to FIG. 7.

For example, a severing can occur in the region of the positive connection between the embossment 49 and the punched-out portion 53. For example, a further recess 57 can be introduced into both the first workpiece part 41 and second workpiece part 44. Furthermore, for example, an end section 58 can be folded along a bending line 59, for example by 90°. A deformation and bending of the first and second workpiece parts 41, 44 can also occur in the overlap region.

After subsequent processing of the first and second workpiece part 41, 44 or the parts composite has been completed, the parts composite can be cut out. In a first step, the connecting bridge 52 can be detached. Furthermore, a region 61 of the residual grid 45 can be detached. The parts composite remains positively connected to the residual grid 45 by the positioning aids 48. The parts composite can be removed by a gripping device. The parts composite can also be finished by a further punching process, as is shown, for example, in FIG. 8. In this punching process, for example the positioning aids 48 are separated since their positive connection is no longer required. In this way, the processed workpiece 34 is completely freed from the residual grid 45. Instead of partially cutting a region 61 of the residual grid 45 free as in FIG. 7, the reinforced component 34 can also be finished immediately by detaching the flap sections 50 with the positioning aids 48.

A reinforced workpiece 34 produced by the methods described herein, for example, is stiff in the middle region and has, for example, a cover or fold-back portion that in the corner region and this cover or fold-back portion is not loadable.

In an alternative embodiment of the methods described herein, instead of positioning a single first workpiece part 41 relative to the second workpiece part 44, multiple first workpiece parts 41 can be introduced into the plate-shaped material 12 and the same number of second workpiece parts 44 can be introduced into second plate-shaped material 13. As a result, all the first workpiece parts 41 can be simultaneously positioned relative to the second workpiece parts 44 by folding the first plate-shaped material 12 onto the second plate-shaped material 13. As an alternative to folding, the first plate-shaped material 12 can also be raised and positioned above the second plate-shaped material 13 and then lowered. In both cases, positioning aids 48 can be provided for aligning the two plate-shaped materials 12, 13. The further working steps described with reference to FIGS. 6 to 8 can then be carried out.

Figure 9:
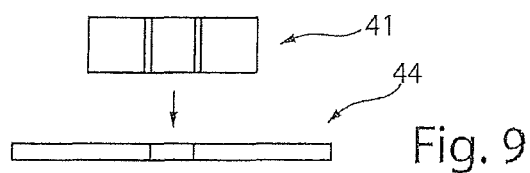
FIG. 9 is a schematic side view of a first and second processing workpiece before they are joined into a reinforced workpiece.
Figure 10:
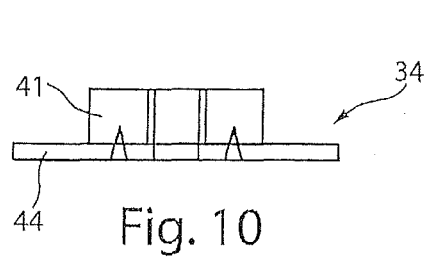
FIG. 10 is a schematic side view of a first embodiment of the reinforced workpiece of FIG. 9.

FIG. 9 schematically shows a first and second workpiece part 41, 44 before they are connected into a processed workpiece 34. A subsequent first processed workpiece 34 embodiment is shown in FIG. 10 where a sheet metal part has a threaded nut attached thereto. The plate-shaped material 13 that is used to form second workpiece part 44 is punched out and is only partially shown. To produce a connecting element, a sleeve is punched out as a first workpiece part 41 from a thicker plate-shaped material 12, or cut out with a laser. This first workpiece part 41 is then positioned with a handling device with respect to the plate-shaped material 13, which includes, for example, a pre-punched hole. The first workpiece part 41 is then connected to the second workpiece part 44, for example by welding. The second workpiece part 44 can then be finished or punched out by a laser beam.

Figure 11:
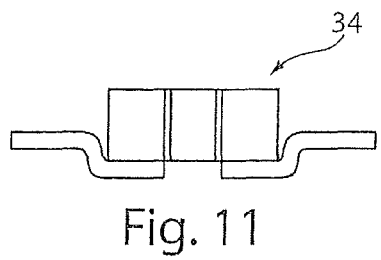
FIG. 11 is a schematic side view of an alternative embodiment of a reinforced workpiece of FIG. 10.

FIG. 11 shows an alternative embodiment of the processed workpiece 34 to FIG. 10. A press connection between the first workpiece part 41 and the second workpiece part 44 is provided. Alternatively, a depression is introduced into the hole region of the second plate-shaped material 13 to enable a defined receiver for the first workpiece part 41. The first workpiece part 41 can also be connected to the second workpiece part 44 by an adhesive, a weld, or a soldered connection.

In both examples of the reinforced workpiece 34 of FIG. 10 and FIG. 11, a thread, for example, may be introduced into the first workpiece part 41 before or after the connection of the two workpiece parts 41, 44. Alternatively, after the merging of the first and second workpiece parts 41, 44 according to FIGS. 9 and 10 or FIGS. 9 and 11, an insertion part, which consists, for example, of a further material, can furthermore be introduced into the at least one bore of the workpiece parts 41, 44. Such an insertion part can be produced, for example, in the working region with a third plate-shaped material.

Figure 12:
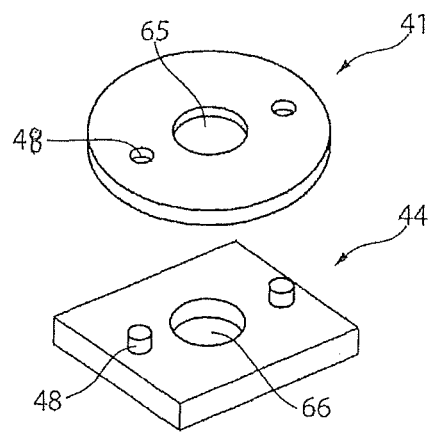
FIG. 12 is a perspective view of a first and second workpiece part before the production of an additional embodiment of a reinforced workpiece.
Figure 13:
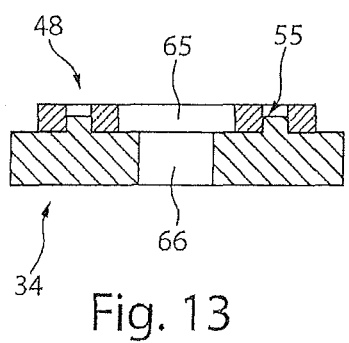
FIG. 13 is a schematic side view of the reinforced workpiece made from the workpieces in FIG. 12.

FIGS. 12 and 13 show a further alternative embodiment for the production of a reinforced workpiece 34 with an example of a counterbore of multi-layer construction. In a first workpiece part 41, for example, a ring is punched out with a bore 65 and positioning aids 48. The second workpiece part 44 includes a central bore 66 and positioning aids 48, which are formed as elevations, studs, or similar. After positioning and aligning the first workpiece part 41 relative to the second workpiece part 44 by the positioning aids 48, the two parts can be further connected by at least two connection points 55, which can be welds that lie directly in the positioning aids 48, for example. The two superimposed workpiece parts 41, 44 thus, form a stepped bore.

Figure 14:
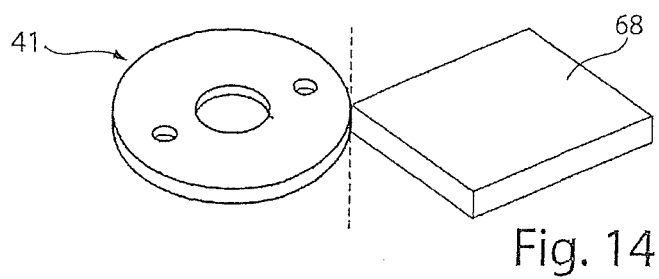
FIG. 14 is a perspective view of a workpiece having a holding bracket.

FIG. 14 shows an example for the handling of a first or second workpiece part 41, 44 that cannot be gripped by a suction gripping device due to the size and/or formation and/or contour of the workpiece and also cannot be gripped by a punching handling tool. The workpiece part 41, 44 is held on a punch by clamping or tensioning. In such cases, a holding bracket 68 can be formed on the first or second workpiece part 41, 44, the holding bracket 68 being a suitable receiving surface for a suction gripping device. This holding bracket 68 can be subsequently detached after the connection of the first workpiece part 41 to the second workpiece part 44 analogously to the subsequent processing of the parts composite described in FIG. 7.

A number of embodiments of the invention have been described. Nevertheless, it will be understood that various modifications may be made without departing from the spirit and scope of the invention. Accordingly, other embodiments are within the scope of the following claims.

What is claimed is:

1. A method for the production of workpieces made of several plate-shaped materials, the method comprising:

positioning and holding a first plate-shaped material with a gripping device in a working region of a processing station of a workpiece processing machine so that the first plate-shaped material is moveable relative to a workpiece support in the working region;

positioning and holding at least one second plate-shaped material with an additional gripping device in the working region of the processing station so that the at least one second plate-shaped material is moveable relative to the workpiece support in the working region;
producing at least one first workpiece part from the first plate-shaped material,
positioning the at least one first workpiece part with respect to the at least one second plate-shaped material in the working region;
connecting the at least one first workpiece part to the second plate-shaped material or to at least one second workpiece part produced from the second plate-shaped material, wherein the at least one second workpiece part is at least partially processed;
finishing the at least one second workpiece part that is connected to the at least one first workpiece part in the processing station; and
cutting at least one of the first and second workpiece parts free from the second plate-shaped material or a residual grid resulting therefrom in a final processing step in the working region of the processing station for removing the at least one first and second workpiece part connected to each other from the second plate-shaped material;
wherein the at least one second workpiece part is partially finished and is still connected to the second plate-shaped material before the positioning of the at least one first workpiece part or is finished except for at least one connecting bridge to the residual grid of the second plate-shaped material.

2. The method of claim 1, further comprising lifting the at least one first workpiece part out of a plane of the workpiece support with a tool or a handling device and positioning the at least one first workpiece part to overlap at least a part of the second plate-shaped material.

3. The method of claim 1, wherein the positioning of the at least one first workpiece part with respect to the at least one second plate-shaped material is carried out with a punching handling tool or with at least one suction gripping device.

4. The method of claim 1, wherein a holding bracket or a holding frame is formed on the at least one first workpiece part for transportation to the second plate-shaped material, and is detached after connecting the first workpiece part and the second workpiece part.

5. The method of claim 1, further comprising introducing at least one positioning aid into the at least one first and/or the at least one second workpiece part before the first workpiece part is positioned with respect to the at least one second processed workpiece part.

6. The method of claim 5, wherein the at least one positioning aid is formed as a hole and a centering stud or as an embossment and a complementary depression.

7. The method of claim 1, wherein the at least one first processed workpiece part and the at least one second workpiece part are connected to one another by joining, clinching without additional material, adhesive bonding, soldering, welding, or mechanical locking.

8. A method for the production of workpieces made of several plate-shaped materials, the method comprising:
positioning and holding a first plate-shaped material with a gripping device in a working region of a processing station of a workpiece processing machine so that the first plate-shaped material is moveable relative to a workpiece support in the working region;
positioning and holding at least one second plate-shaped material with an additional gripping device in the working region of the processing station so that the at least one second plate-shaped material is moveable relative to the workpiece support in the working region;
producing at least one first workpiece part from the first plate-shaped material,
positioning the at least one first workpiece part with respect to the at least one second plate-shaped material in the working region;
connecting the at least one first workpiece part to the second plate-shaped material or to at least one second workpiece part produced from the second plate-shaped material, wherein the at least one second workpiece part is at least partially processed; and
finishing the at least one second workpiece part that is connected to the at least one first workpiece part in the processing station,
wherein several first workpiece parts are produced in the first plate-shaped material, and an equal number of second workpiece parts are produced in the second plate-shaped material and the first and second workpiece parts are then held by connecting bridges in a residual grid of the first and second plate-shaped materials and the first plate-shaped material is positioned completely above the second plate-shaped material.

9. The method of claim 8, wherein the first plate-shaped material is positioned by folding the first plate-shaped material over the second plate-shaped material.

10. The method of claim 8, wherein the first plate-shaped material is positioned by lifting and moving the first plate-shaped material out of a workpiece support plane to a position above the second plate-shaped material and then lowering the first plate-shaped material onto the second plate-shaped material.

11. The method of claim 1, wherein the first and at least one further second plate-shaped material are processed with one or more of a punching tool, a bending tool, and a laser.

12. The method of claim 1, wherein reinforced workpieces are produced from the first workpiece part as a connecting component and the at least one second workpiece part is produced from a plate-shaped material.

13. The method of claim 12, wherein the connecting component is a threaded insert or a threaded sleeve.

14. The method of claim 1, wherein a reinforced workpiece is produced as an assembly from several different materials, material thicknesses, or both.

15. The method of claim 1, wherein a reinforced workpiece is formed by a multi-layer construction made from several plate-shaped materials.

* * * * *